(12) United States Patent
Ueno et al.

(10) Patent No.: US 10,385,791 B2
(45) Date of Patent: Aug. 20, 2019

(54) ENGINE CONTROL DEVICE

(71) Applicant: MAZDA MOTOR CORPORATION, Hiroshima (JP)

(72) Inventors: Tomohiro Ueno, Hiroshima (JP); Yusuke Higuchi, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 300 days.

(21) Appl. No.: 15/447,826

(22) Filed: Mar. 2, 2017

(65) Prior Publication Data
US 2017/0260921 A1 Sep. 14, 2017

(30) Foreign Application Priority Data
Mar. 14, 2016 (JP) ................................ 2016-050047

(51) Int. Cl.
*F01N 3/20* (2006.01)
*F02D 41/02* (2006.01)
(Continued)

(52) U.S. Cl.
CPC ........ *F02D 41/0255* (2013.01); *F01N 3/2006* (2013.01); *F02D 37/02* (2013.01);
(Continued)

(58) Field of Classification Search
CPC .............. F01N 3/2006; F01N 2430/06; F01N 2430/08; F01N 2900/08; F02D 37/02; F02D 41/0002; F02D 41/0255; F02D 41/068; F02D 41/26; F02D 41/3029; F02D 41/3076; F02D 41/402; F02D 2200/101; F02D 2200/501; F02F 3/28; F02P 5/15; F02P 5/1506; F02P 5/1508
See application file for complete search history.

(56) References Cited

U.S. PATENT DOCUMENTS 8,028,515 B2 * 10/2011 Oshimi ............... F02D 13/0226
60/274
2003/0015168 A1 * 1/2003 Yoshida .................. F02D 37/02
123/295
(Continued)

FOREIGN PATENT DOCUMENTS

JP 2014-136989 A 7/2014
WO WO-2014112370 A1 * 7/2014 ............. F02D 13/02

*Primary Examiner* — Jason D Shanske
*Assistant Examiner* — Matthew T Largi
(74) *Attorney, Agent, or Firm* — Studebaker & Brackett PC

(57) ABSTRACT

A PCM (60) performs a catalyst early warming control (AWS control) for accelerating warm-up of a catalytic device. When the catalytic device (35) is not in an activated state and a vehicle is traveling, the PCM (60) is configured to perform: a fuel injection control to inject fuel such that a homogeneous fuel-air mixture can be formed in a combustion chamber (11) of an engine (10) so as to generate a homogeneous combustion; an intake air amount control to increase intake air amount; and an ignition control to retard ignition timing from a reference ignition timing. In addition, the PCM (60) is configured to vary ignition timing retard amount corresponding to a difference between the ignition timing retarded by the ignition timing control and the reference ignition timing, in accordance with engine speed and/or engine load.

6 Claims, 9 Drawing Sheets

(51) Int. Cl.
*F02D 37/02* (2006.01)
*F02D 41/00* (2006.01)
*F02D 41/26* (2006.01)
*F02D 41/30* (2006.01)
*F02F 3/28* (2006.01)
*F02P 5/15* (2006.01)
*F02D 41/06* (2006.01)
*F02D 41/40* (2006.01)

(52) U.S. Cl.
CPC ....... *F02D 41/0002* (2013.01); *F02D 41/068* (2013.01); *F02D 41/26* (2013.01); *F02D 41/3029* (2013.01); *F02D 41/3076* (2013.01); *F02D 41/402* (2013.01); *F02F 3/28* (2013.01); *F02P 5/15* (2013.01); *F01N 2430/06* (2013.01); *F01N 2430/08* (2013.01); *F01N 2900/08* (2013.01); *F02D 2200/101* (2013.01); *F02D 2200/501* (2013.01); *F02P 5/1506* (2013.01); *F02P 5/1508* (2013.01); *Y02A 50/2322* (2018.01); *Y02T 10/26* (2013.01); *Y02T 10/42* (2013.01); *Y02T 10/44* (2013.01); *Y02T 10/46* (2013.01)

(56) References Cited

U.S. PATENT DOCUMENTS

2009/0293842 A1\* 12/2009 Akazaki ................ F02D 35/023
123/406.41
2015/0337751 A1\* 11/2015 Watanabe ............... F02D 13/02
701/113

\* cited by examiner

FIG.1

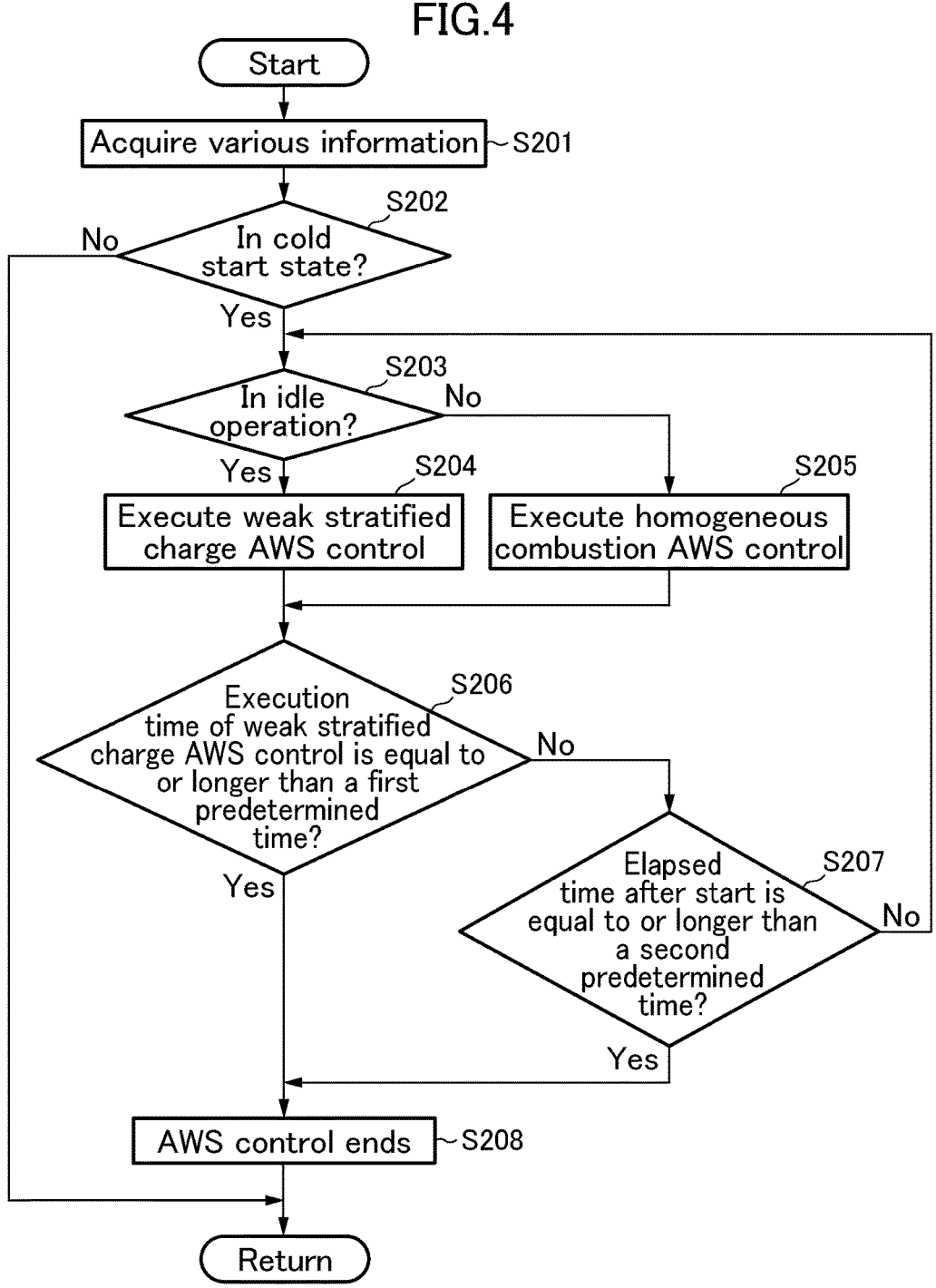

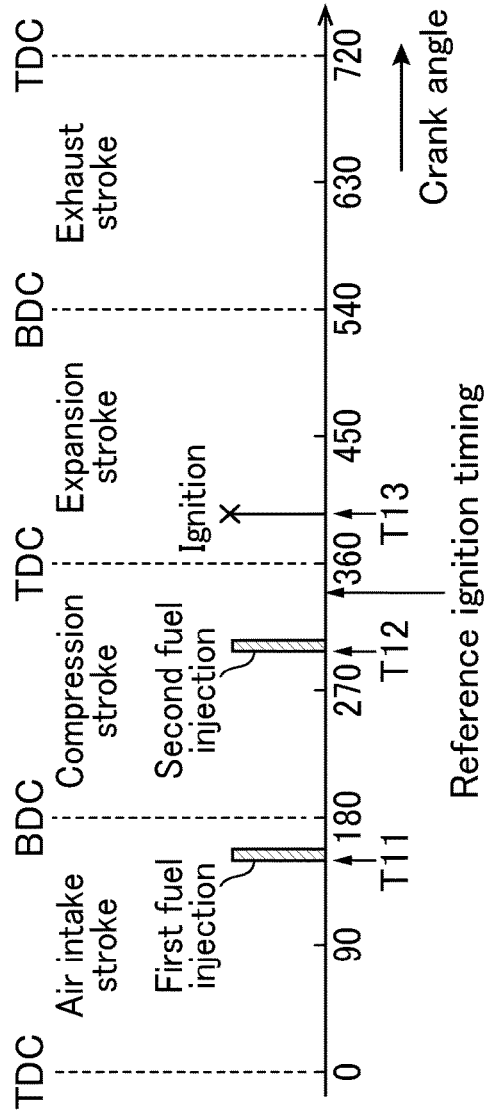
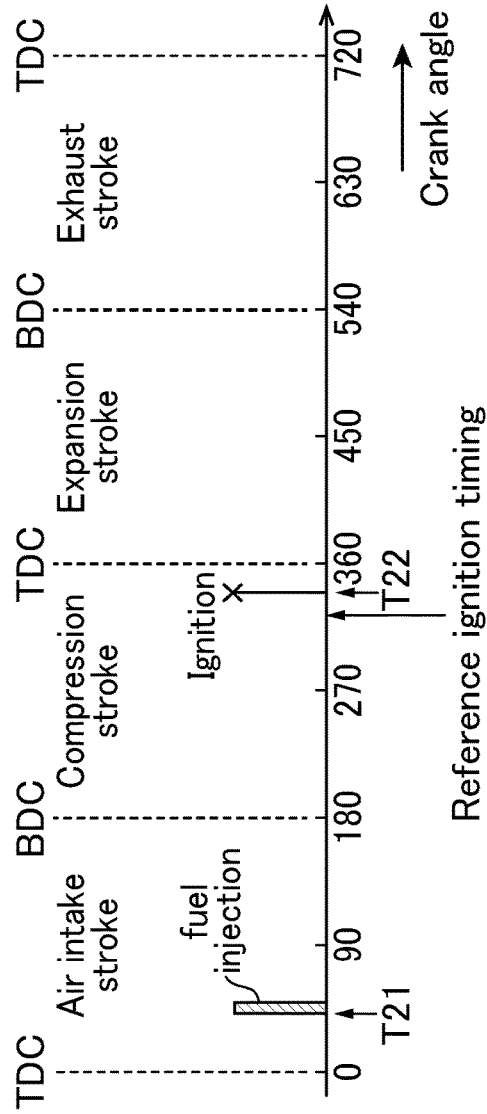
FIG.6A
FIG.6B

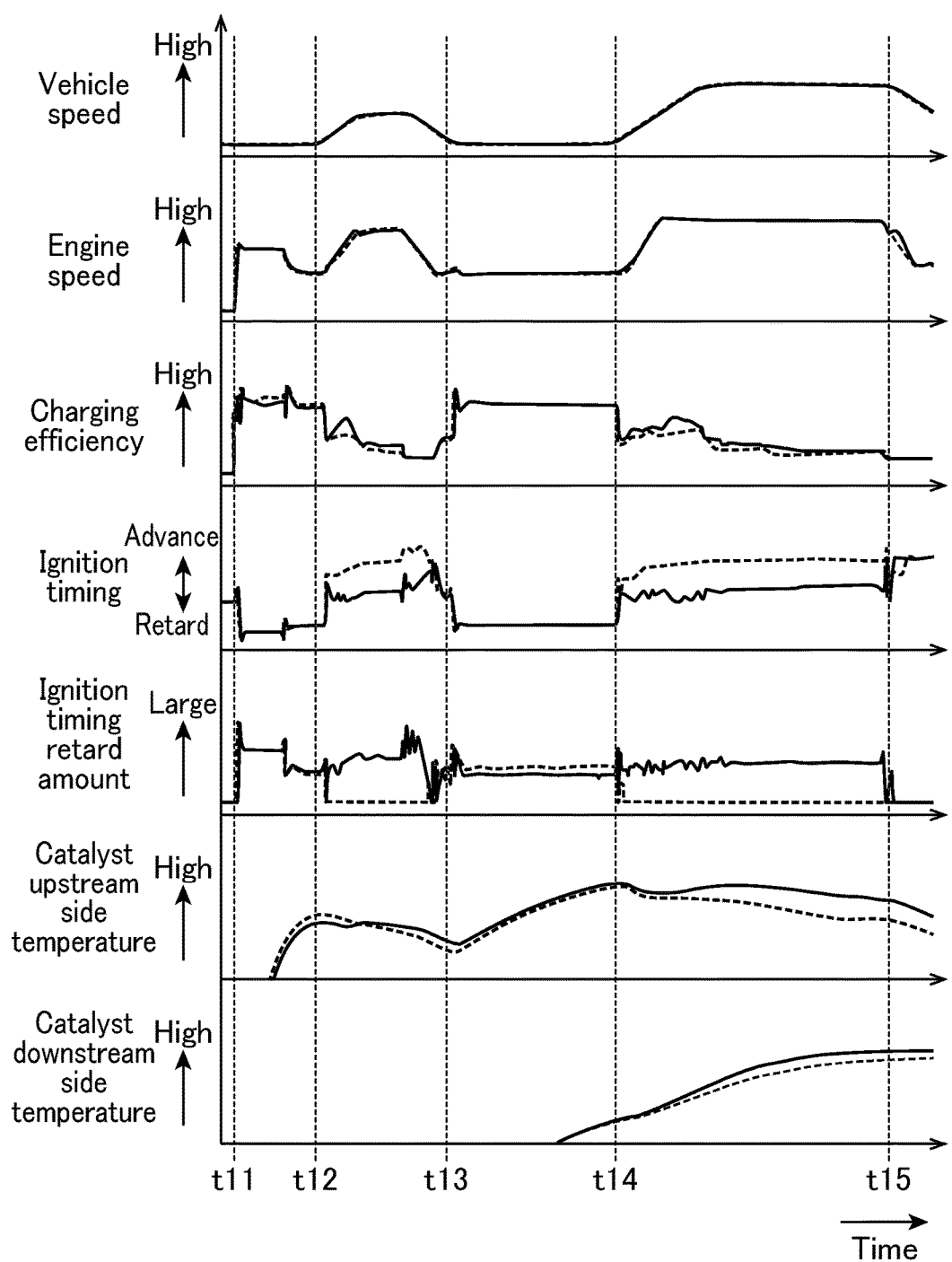

ENGINE CONTROL DEVICE

BACKGROUND OF THE INVENTION

Field of the Invention

The present invention relates to an engine control device, and more particularly to an engine control device which performs a catalyst early warming control for accelerating warm-up of a catalytic device provided on an exhaust gas passage.

Description of Related Art

Conventionally, in a spark-ignition engine, in order to accelerate warm-up of a catalytic device provided on an exhaust gas passage, a technique referred as AWS (Accelerated Warm-up System) has been implemented. The AWS is a technique for accelerating warm-up of a catalytic device, in a situation such as immediately after an engine cold start and the catalytic device is not in an activated state, for example, by increasing the intake air amount and retarding the ignition timing beyond the compression top dead center than in a case when the catalytic device is in an activated state under the same operating state (for example, idling operation), to thereby cause afterburning of fuel-air mixture even during the expansion stroke so as to increase the exhaust gas temperature and eventually the exhaust gas heat quantity (for example, refer to Patent Document 1: Japanese Laid-Open Patent Publication 2014-136989A). More specifically, Patent Document 1 discloses that injected fuel is split into two parts (split injection) to form a weak stratified charge state in a combustion chamber so as to generate weak stratified charge combustion, in order to suppress degradation of the combustion caused by the retardation of the ignition timing in executing the AWS as described above. Here, the weak stratified charge state corresponds to a state where the fuel-air mixture in the combustion chamber becomes relatively rich in the vicinity of an ignition plug (particularly, in the vicinity of an electrode of the ignition plug), and becomes relatively lean around such area (weak stratification of the fuel-air mixture inside a cylinder).

BRIEF SUMMARY OF THE INVENTION

Technical Problem

In the technique described in the aforementioned Patent Document 1, the catalyst early warming control for early warming the catalytic device (hereinafter referred suitably as "AWS control") is executed only in an idle operation (in other words, when the vehicle is stopped). Thus, when the vehicle is traveling (in other words, when the vehicle has a traveling speed), the AWS control may not be executed even if the catalytic device is not in the activated state. Therefore, the technique described in Patent Document 1 has a tendency that the warm-up of the catalytic device may be delayed.

Then, it may be conceived that the AWS control be executed also when the vehicle is traveling. But, if the weak stratified charge combustion is executed as in the technique described in Patent Document 1 when the vehicle is traveling, a desired weak stratified charge state may not be established under a condition when the operating state of the engine is changed, and thereby to occur problems such as misfire. On the other hand, it may be conceived that a homogeneous combustion (which forms a homogeneous fuel-air mixture in the combustion chamber for combustion) is performed instead of the weak stratified charge combustion in the AWS control. But, since such homogeneous combustion has a worse combustion state compared with the weak stratified charge combustion, if the ignition timing is retarded in the homogeneous combustion similar to the case where the weak stratified charge combustion is applied, problems such as misfire may occur and drivability may be degraded.

The present invention has been made to solve the aforementioned conventional problems inherent to the conventional control system, and an object thereof is to provide an engine control device which can appropriately accelerate the warm-up of the catalytic device by the catalyst early warming control while suppressing the degradation of drivability when the vehicle is traveling.

Solution to Problem

In order to achieve the above object, in the present invention, there is provided an engine control device, including a controller configured to perform a catalyst early warming control for accelerating warm-up of a catalytic device provided on an exhaust gas passage, wherein, in order to accelerate the warm-up of the catalytic device when the catalytic device is not in an activated state and a vehicle is traveling, the controller is configured to perform: a fuel injection control to inject fuel such that a homogeneous fuel-air mixture can be formed in a combustion chamber of an engine so as to generate a homogeneous combustion; an intake air amount control to increase intake air amount as compared with a situation when the catalyst early warming control is not performed; and an ignition control to retard ignition timing from a reference ignition timing which is used in a situation when the catalyst early warming control is not performed, wherein the controller is further configured to vary ignition timing retard amount corresponding to a difference between the ignition timing retarded by the ignition timing control and the reference ignition timing, in accordance with engine speed and/or engine load.

According to the above present invention, when the catalytic device is not in the activated state, the catalyst early warming control (AWS control) is performed even when the vehicle is traveling, in other words, the catalyst early warming control is performed not only when the vehicle is stopped, but also when the vehicle is traveling. Therefore, it is possible to promptly increase temperature of the catalytic device to effectively accelerate the warm-up of the catalytic device as compared with a situation where the catalyst early warming control is performed only when the vehicle is stopped. In addition, according to the present invention, the catalyst early warming control is performed while producing the homogeneous combustion when the vehicle is traveling. Therefore, it is possible to appropriately suppress the misfire (which may be caused due to a failure of establishing a desired stratified charge state due to a change in an operating state of the engine, for example) or the like which may be caused when the catalyst early warming control is performed when a stratified charge combustion is being produced and the vehicle is traveling.

Further, according to the present invention, in a case where the catalyst early warming control is performed while producing the homogeneous combustion when the vehicle is traveling, since the ignition timing retard amount from the reference ignition timing is varied taking into account the operating state of the engine, it is possible to appropriately warm-up the catalytic device by the catalyst early warming control while suppressing the degradation of drivability (for example, combustion sound and/or misfire) due to an excessive retardation in the ignition timing during the catalyst early warming control.

In the present invention, preferably, in a low load area where the engine load is lower than a predetermined value, the controller is configured to make the ignition timing retard amount smaller than in a high load area where the engine load is equal to or higher than the predetermined value, under the same engine speed.

According to the above present invention, it is possible to appropriately suppress the degradation of drivability due to an excessive retardation in the ignition timing, in the low load area wherein the flow in a cylinder is weak and the flame propagation is therefore slow so that the combustion stability is low.

In the present invention, preferably, the controller is configured to make the ignition timing retard amount smaller as the engine load becomes lower.

According to the above present invention, it is possible to secure the ignition timing retard amount as much as possible when the catalyst early warming control is performed in the aforementioned low load area, while suppressing the degradation of drivability in said low load area.

In the present invention, preferably, in a high speed area where the engine speed is equal to or higher than a predetermined value, the controller is configured to make the ignition timing retard amount larger than in a low speed area where the engine speed is lower than the predetermined value, under the same engine load.

According to the above present invention, since the ignition timing retard amount is made larger in the high speed area where the combustion stability becomes high, it is possible to increase temperature of the catalytic device more promptly.

In the present invention, preferably, the reference ignition timing is set based on a target torque to be output from the engine, and the controller is configured to increase the intake air amount in accordance with the ignition timing retard amount so as to output the target torque from the engine, when the ignition timing is retarded by the ignition timing retard amount from the reference ignition timing.

According to the above present invention, in a case where the ignition timing is retarded by the catalyst early warming control, since the intake air amount is increased in accordance with the ignition timing retard amount, it is possible to appropriately realize the target torque even during the catalyst early warming control.

In the present invention, preferably, when the catalytic device is not in the activated state and the vehicle is stopped, the controller is configured to perform the intake air amount control and the ignition control while performing the fuel injection control such that a layer of rich fuel-air mixture is formed in the vicinity of an ignition plug as compared with an area around the ignition plug in the combustion chamber of the engine so as to generate a stratified charge combustion, in order to accelerate the warm-up of the catalytic device.

According to the above present invention, the catalyst early warming control is performed while producing the homogeneous combustion during the traveling of the vehicle, and the catalyst early warming control is performed while producing a stratified charge combustion during the stop of the vehicle, in other words, the catalyst early warming control is performed by switching between the homogeneous combustion and the stratified charge combustion in accordance with the operating condition of the vehicle. Therefore, it is possible to execute the catalyst early warming control appropriately for the operating condition to promptly increase temperature of the catalytic device while appropriately suppressing the degradation of drivability such as misfire or the like.

According to the engine control device of the present invention, it is possible to appropriately perform the catalyst early warming control in order to accelerate warm-up of a catalytic device while suppressing the degradation of drivability such as misfire or the like when the vehicle is traveling.

BRIEF DESCRIPTION OF THE SEVERAL VIEWS OF THE DRAWINGS

FIG. 1 is a schematic configuration diagram of an engine device to which an engine control device according to an embodiment of the present invention is applied.

FIG. 4 is a flow chart depicting an AWS control process according to an embodiment of the present invention.

FIGS. 6A and 6B are illustrative diagrams with respect to fuel injection timing to be applied when respective ones of a weak stratified charge AWS control and a homogeneous combustion AWS control is performed in an embodiment of the present invention.

FIG. 10 is an example of a time chart when the AWS control process is executed according to an embodiment of the present invention.

DETAILED DESCRIPTION OF THE INVENTION

With reference to the accompanying drawings, an engine control device according to an embodiment of the present invention will now be described.

<System Configuration>

Figure 1:
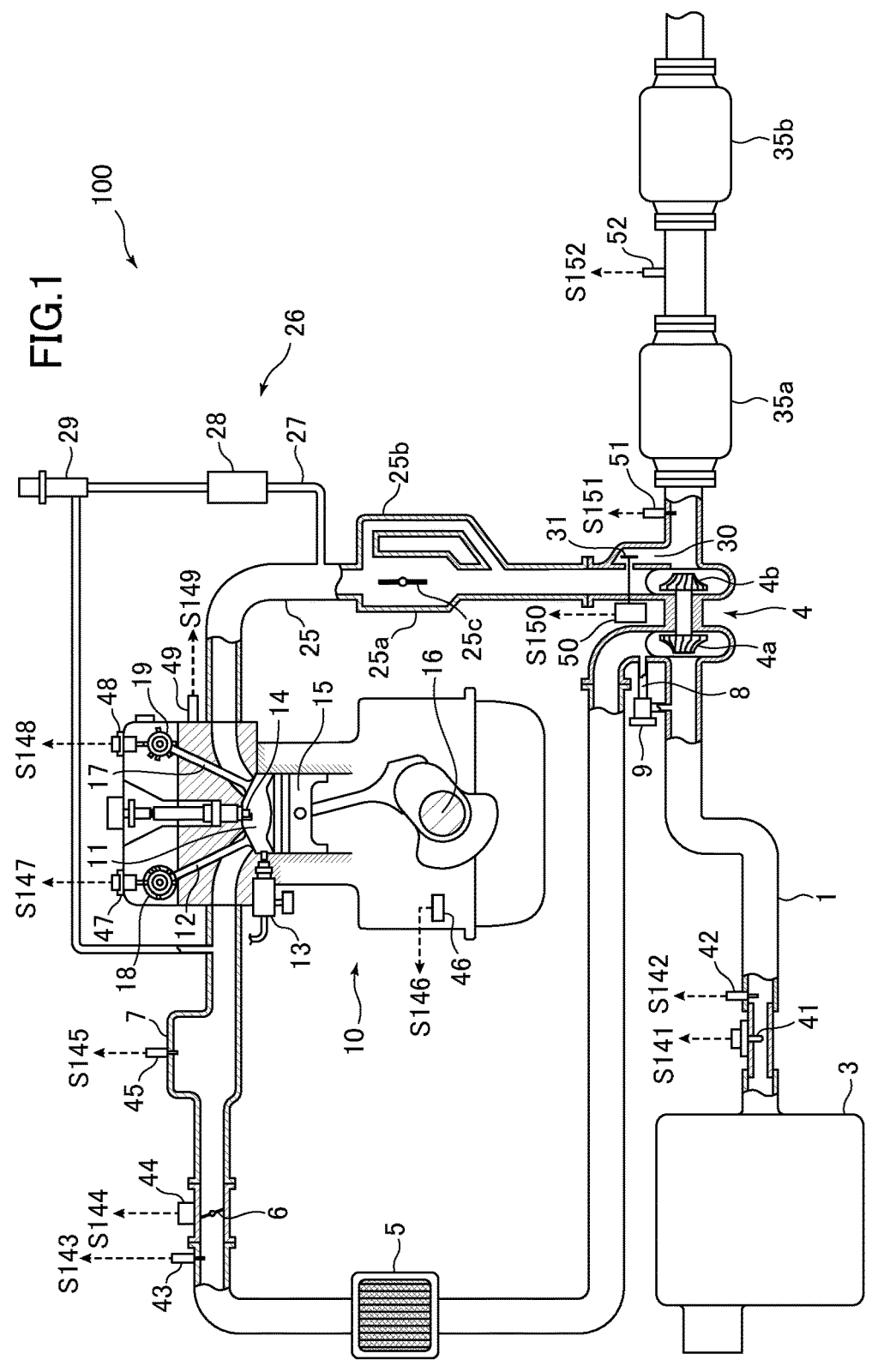
Figure 2:
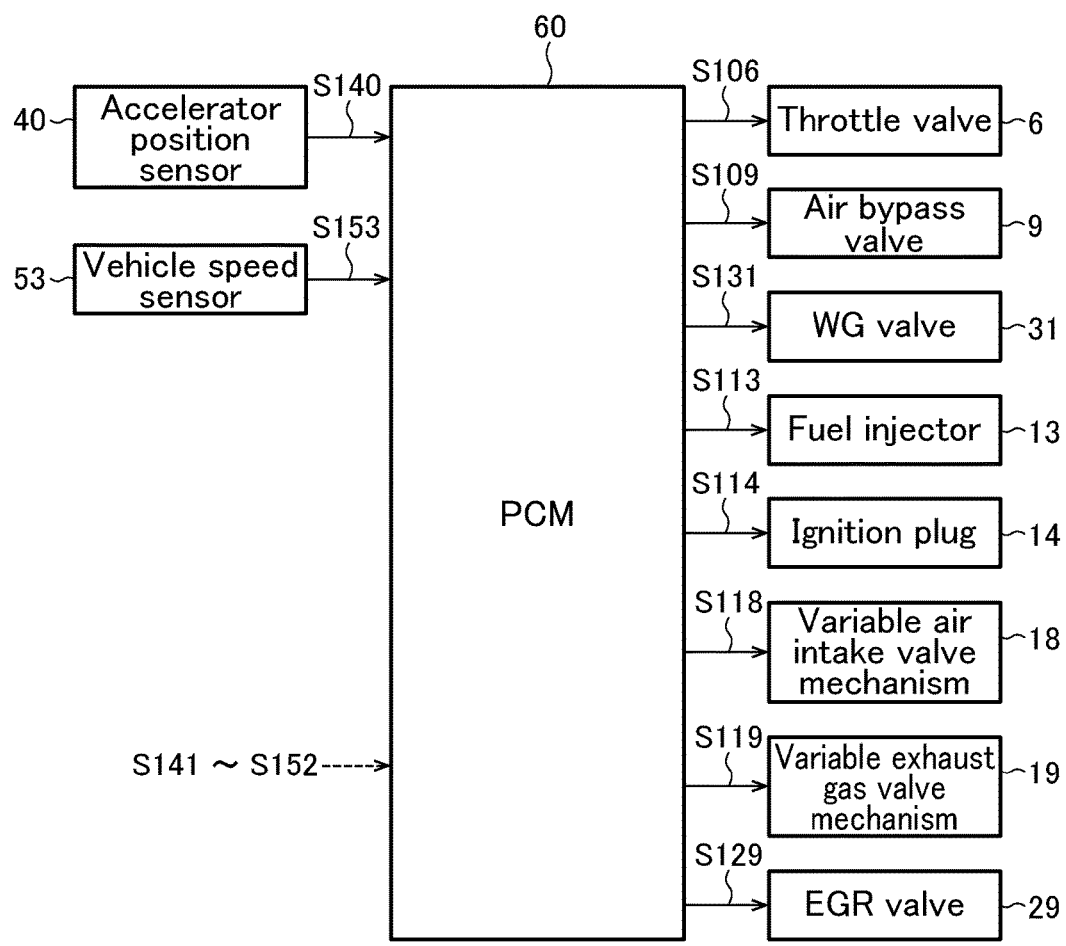
FIG. 2 is a block diagram depicting an electrical configuration of an engine control device according to an embodiment of the present invention.

First of all, with reference to FIGS. 1 and 2, description will be made on an engine system to which an engine control device according to an embodiment of the present invention is applied. FIG. 1 is a schematic configuration diagram of an engine system to which an engine control device according to an embodiment of the present invention is applied, and FIG. 2 is a block diagram depicting an electrical configuration of an engine control device according to an embodiment of the present invention.

As shown in FIG. 1, an engine system 100, mainly, includes: an air intake passage 1 through which intake air (air) introduced from outside passes; an engine 10 (specifically, a gasoline engine) for burning fuel-air mixture of the intake air supplied from such air intake passage 1 and a fuel supplied from a fuel injector 13 described in the followings to generate power for a vehicle; an exhaust gas passage 25 for discharging exhaust gas generated by the combustion in the engine 10; sensors 40 to 53 for detecting various parameters related to the engine system 100; and the PCM 60 (engine control device) for controlling the entire engine system 100.

On the air intake passage 1, there are provided, starting from the upstream side, an air cleaner 3 for cleaning intake air introduced from outside, a compressor 4a of a turbo-supercharger 4 for boosting the passing intake air to raise intake air pressure, an intercooler 5 for cooling the intake air by outside air and/or cooling water, a throttle valve 6 for adjusting the amount of passing intake air (the intake air amount), and a surge tank 7 for temporarily storing intake air to be supplied to the engine 10.

In addition, in the air intake passage 1, there is provided an air bypass passage 8 for having a part of the intake air supercharged by the compressor 4a flown back to the upstream side of the compressor 4a. Specifically, one end of the air bypass passage 8 is connected to the air intake passage 1 which is positioned downstream of the compressor 4a and upstream of the throttle valve 6, and the other end of the air bypass passage 8 is connected to the air intake passage 1 which is positioned downstream of the air cleaner 3 and upstream of the compressor 4a.

On the air bypass passage 8, there is provided an air bypass valve 9 for adjusting flow rate of the intake air flowing through the air bypass passage 8 by an opening and closing operation. The air bypass valve 9 is a so-called ON-OFF valve which is switchable between a closed state in which the air bypass passage 8 is fully closed and an open state in which the passage is fully open.

The engine 10, mainly, includes: an air intake valve 12 for introducing the intake air supplied from the air intake passage 1 to a combustion chamber 11; a fuel injector 13 for injecting fuel into the combustion chamber 11; an ignition plug 14 for igniting the fuel-air mixture of the intake air and the fuel supplied to the combustion chamber 11; a piston 15 which performs reciprocating motion under the combustion of fuel-air mixture inside the combustion chamber 11; a crank shaft 16 rotated by the reciprocating motion of the piston 15; and an exhaust gas valve 17 for discharging exhaust gas generated by the combustion of fuel-air mixture inside the combustion chamber 11, to the exhaust gas passage 25. Further, the fuel injector 13 includes a plurality of injection holes at its injection surface (in other words, it is configured as a multihole type), and the fuel may be injected from such injection holes toward a plurality of directions.

In addition, the engine 10 is configured to vary respective operation timings (in other words, opening and closing timing) of each of the air intake valve 12 and the exhaust gas valve 17 by a variable air intake valve mechanism 18 and a variable exhaust gas valve mechanism 19, that is constituting a Variable Valve Timing (VVT) Mechanism. Various types of publicly-known variable air intake valve mechanism 18 and variable exhaust gas valve mechanism 19 are applicable, but it is possible to vary the operation timings of the air intake valve 12 and the exhaust gas valve 17 using a mechanism configured as an electromagnetic type or a hydraulic type, for example.

On the exhaust gas passage 25, there are provided, starting from the upstream side, a turbine 4b of the turbo-supercharger 4 which is rotated by the passing exhaust gas, the rotation of the turbine in turn driving the compressor as described in the above, and catalytic devices 35a, 35b having a function for cleaning the exhaust gas such as a NOx catalyst and/or a ternary catalyst and/or an oxidation catalyst, for example. Hereinafter, when respective ones of the catalytic devices 35a, 35b may be used without any differentiation, it is simply mentioned as "catalytic device 35".

In addition, on the exhaust gas passage 25, there is provided an EGR device 26 which allows a part of the exhaust gas to flow back to the air intake passage 1 as an EGR gas. The EGR device 26 has an EGR passage 27 connected to the exhaust gas passage 25 which is positioned upstream of the turbine 4b at one end, and to the air intake passage 1 which is positioned downstream of the compressor 4a and downstream of the throttle valve 11 at the other end, an EGR cooler 28 for cooling the EGR gas, and an EGR valve 29 for controlling the amount of EGR gas (flow rate) flowing through the EGR passage 27. Such EGR device 26 corresponds to a so-called HPL (High Pressure Loop) EGR device.

In addition, on the exhaust gas passage 25, there is provided a turbine bypass passage 30 for allowing the exhaust gas to bypass the turbine 4b of the turbo-supercharger 4. In the turbine bypass passage 30, there is provided a waste gate valve (hereinafter referred as "WG valve") 31 for controlling the flow rate of the exhaust gas flowing through the turbine bypass passage 30.

In addition, the exhaust passage 25 is branched into a first passage 25a and a second passage 25b by a connecting part which is positioned upstream of the EGR passage 27 and the connecting part which is positioned upstream of the turbine bypass passage 30. The first passage 25a has a larger diameter than the second passage 25b, in other words, the second passage 25b has a smaller diameter than the first passage 25a, and an open and close valve 25c is provided in the first passage 25a. When the valve 25c is open, the exhaust gas primarily flows into the first passage 25a, and when the valve 25c is closed, the exhaust vale flows only into the second valve 25b. Thus, when the valve 25c is closed, the flow rate of the exhaust gas becomes higher than when the valve 25c is open. The open and close valve 25c is closed under a low rotation speed area, and supplies the exhaust gas of an increased flow speed to the turbine 4b of the turbo-supercharger 4 to thereby enhance the supercharging function by the turbo-supercharger 4 even under the low rotation speed area.

In the engine system 100, there are provided sensors 40 to 53 for detecting various parameters related to the engine system 100. These sensors 40 to 53 are specifically described in the followings. An accelerator position sensor 40 detects accelerator position which is the position of the accelerator pedal (corresponding to the amount depressed or actuated by the accelerator pedal by a driver). An air flow sensor 41 detects the intake air amount in terms of flow rate of the intake air which passes through the intake air passage 1 between the air cleaner 3 and the compressor 4a. A temperature sensor 42 detects the temperature of the intake air which passes through the intake air passage 1 between the air cleaner 3 and the compressor 4a. A pressure sensor 43 detects supercharging pressure. A throttle position sensor 44 detects the throttle position which is an opening of the throttle valve 5 determined by the position of the throttle valve 6. A pressure sensor 33 detects an intake manifold pressure which is the pressure of the intake air supplied to the engine 10. A crank angle sensor 46 detects a crank angle of the crank shaft 16. An intake air side cam angle sensor 47 detects the cam angle of an intake air cam shaft. An exhaust side cam angle sensor 48 detects the cam angle of an exhaust air cam shaft. A temperature sensor 49 detects the temperature of the cooling water (water temperature) of the engine 10. A WG position sensor 50 detects the position of the WG valve 31. An $O_2$ sensor 51 detects oxygen concentration in the exhaust gas which is positioned upstream of the catalytic device 35a, and an $O_2$ sensor 52 detects the oxygen concentration in the exhaust gas between the catalytic device 35a and the catalytic device 35b. A vehicle speed sensor 53 detects speed of the vehicle (vehicle speed). Such sensors 40 to 53 respectively output detection signals S140 to S153 corresponding to respective ones of the detected parameters, to the PCM 60.

The PCM 60 functions to perform a control of the components in the engine system 100 based on the detection signals S140 to S153 introduced from the aforementioned sensors 40 to 53. Specifically, as shown in FIG. 2, the PCM 60 functions: to supply a control signal S106 to the throttle valve 6 to control the opening and closing timing and/or the throttle position of the throttle valve 6; to supply a control signal S109 to the air bypass valve 9 to control opening and closing of the air bypass valve 9; to supply a control signal S131 to the WG valve 31 to control the position of the WG valve 31; to supply a control signal 5113 to the fuel injector 13 to control the fuel injection amount and/or fuel injection timing; to supply a control signal 5114 to the ignition plug 14 to control the ignition timing; to supply control signals S118, S119 respectively to the variable air intake valve mechanism 18 and the variable exhaust gas valve mechanism 19 to control the operation timings of the intake valve 12 and the exhaust gas valve 17; and to supply a control signal 5129 to the EGR valve 29 to control the position of the EGR valve 29.

More particularly, in the present embodiments, the PCM 60 functions to perform a catalyst early warming control (AWS control) for accelerating warm-up of the catalytic device 35 when the catalytic device 35 is not in an activated state such as at an engine cold start, for example Basically, the PCM 60 functions to perform an intake air amount control for increasing the amount of air as compared with a situation when the AWS control is not performed, and an ignition timing control for retarding the ignition timing from a reference ignition timing which is used in a situation when the AWS control is not performed, in order to cause afterburning of fuel-air mixture even during an expansion stroke so as to increase the exhaust gas temperature (exhaust gas heat quantity), to thereby accelerate the warm-up of the catalytic device 35. The PCM 60 corresponds to the "controller" in the present invention.

The above components of the PCM 60 are functionally realized by a computer which includes a CPU, various programs (including a basic control program such as an OS, and an application program capable of being activated on the OS to realize a specific function) to be interpreted and executed by the CPU, and an internal memory such as ROM or RAM storing therein the programs and a variety of data.

<Engine Control Process>

Figure 3:
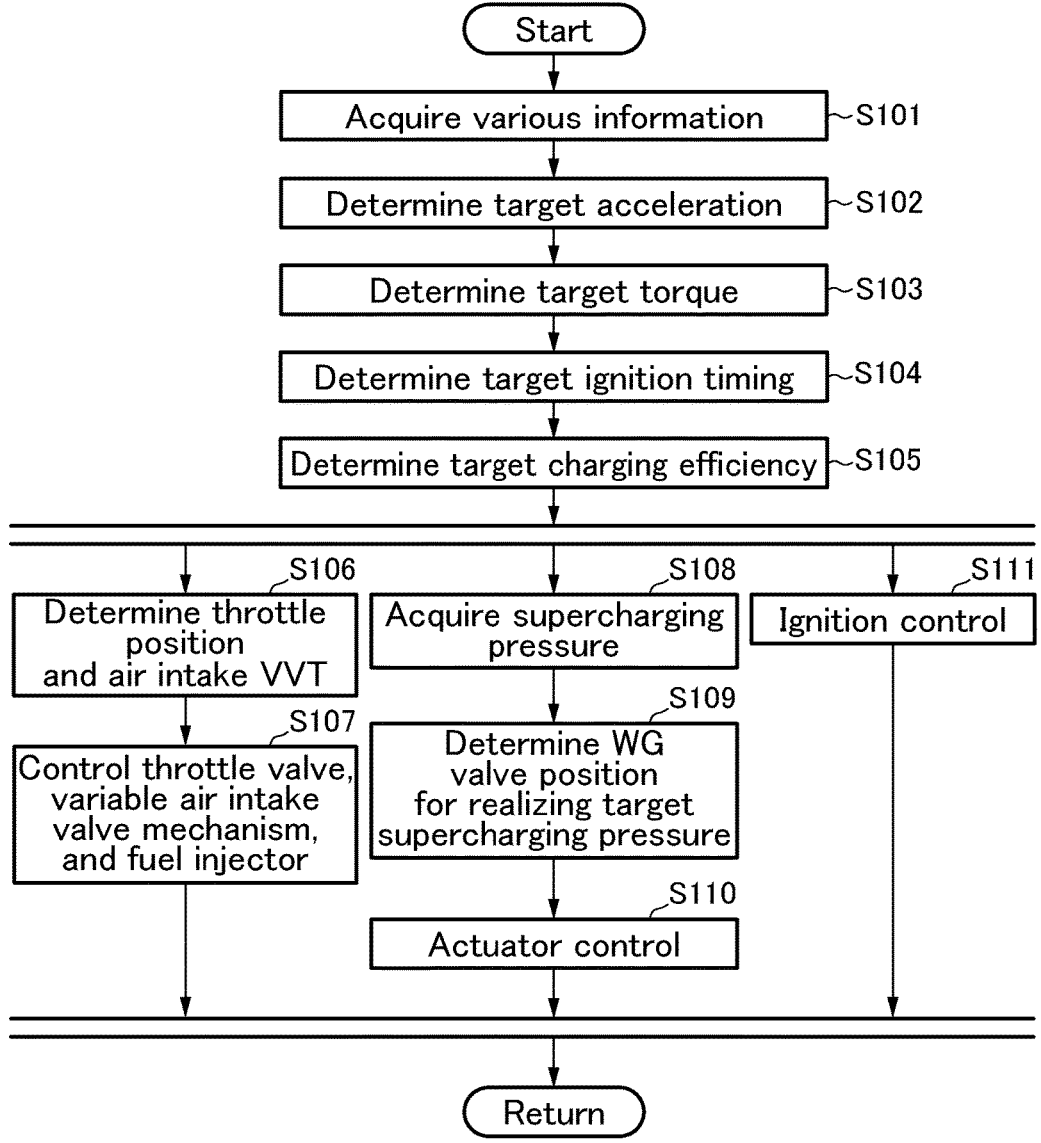
FIG. 3 is a flow chart depicting an engine control process according to an embodiment of the present invention.

Next, with reference to FIG. 3, description will be made on a basic control of the engine 10 performed in an embodiment of the present invention. FIG. 3 is a flowchart depicting an engine control process according to an embodiment of the present invention. The flow is activated when an ignition switch of a vehicle is turned on to apply power to the PCM 60 of the engine, and is repeatedly executed with a given cycle period.

When the engine control step is started, in step S101, the PCM 60 functions to acquire various information signals of a vehicle. Specifically, the PCM 60 functions to acquire one or more of the accelerator position signal detected by the accelerator position sensor 40, the vehicle speed signal detected by the vehicle speed sensor 53, a signal of engine speed corresponding to the crank angle signal detected by the crank angle sensor 64, and a gear stage currently set in a transmission of the vehicle.

Subsequently, in step S102, the PCM 60 functions to set a target acceleration based on the driving state of the vehicle acquired in step S101. Specifically, the PCM 60 functions to select, from a plurality of acceleration characteristic maps defined with respect to various vehicle speeds and various transmission gear stages (the maps are created in advance and stored in a memory or the like), one acceleration characteristic map corresponding to a current vehicle speed and a current transmission gear stage, and determine the target acceleration corresponding to an accelerator position detected by the accelerator position sensor 40, with reference to the selected acceleration characteristic map.

Subsequently, in step S103, the PCM 60 functions to determine the target torque of the engine 10 which is required for realizing the target acceleration determined in step S102. In this case, the PCM 60 functions to determine the target torque within a torque range which can be produced by the engine 10, based on the current vehicle speed, the transmission gear stage, road grade, road surface friction ($\mu$), etc.

Subsequently, in step S104, the PCM 60 functions to set a target ignition timing to be executed by the ignition plug 14 in accordance with the current engine speed acquired in step S101 and the driving state of the engine 10 including the target torque determined in step S103. Specifically, the PCM 60 functions to calculate a target indicated torque produced by adding loss torque due to a friction loss and/or a pumping loss to the target torque, and select, from a plurality of ignition timing maps (ignition timing advance maps) defining a relationship between the ignition timing and the indicated torque with respect to various charging efficiency and various engine speed, one of the ignition timing maps which corresponds to the current engine speed and from which the target indicated torque can be acquired in the vicinity of MBT, and set the target ignition timing corresponding to the target indicated torque, with reference to the selected ignition timing map. Further, when a knocking is occurring, the PCM 60 may function to correct the target ignition timing set as described above to a retarded timing side.

More particularly, in the present embodiments, when the AWS control for effecting the expedited warm-up of the catalytic device 35 is being performed, the PCM 60 functions to set an ignition timing, which is a timing retarded by a predetermined ignition timing retard amount, as the target ignition timing determined from the aforementioned ignition timing map (corresponding to the reference ignition timing used in when the AWS control is not performed). Specifically, there is defined, in advance, the ignition timing retard amount to be set in accordance with the operating state of the engine 10 when the AWS control is to be performed, as a map (hereinafter referred as "ignition timing retard map"). When the AWS control is to be performed, the PCM 60 functions to determine the ignition timing retard amount in accordance with the current operating state of the engine 10 with reference to such map in order to set the target ignition timing from such ignition timing retard amount. Further, details of the ignition timing retard map will be described in the followings.

Subsequently, in step S105, the PCM 60 functions to set a target charging efficiency for having the engine 10 output the target torque determined in step S103. Specifically, the PCM 60 functions to determine a required mean effective pressure necessary for outputting the above described target indicated torque as well as heat value (required heat value) corresponding to the required mean effective pressure to determine the target charging efficiency based either on a basic heat efficiency or an actual heat efficiency, and the required heat value, in accordance with a dimensional relationship between the heat efficiency (basic heat efficiency) on a condition set in the above described target ignition timing and the heat efficiency (actual heat efficiency) under the actual driving state of the engine 10. Further, the PCM 60 functions to appropriately limit the target charging efficiency determined as described above based on the required mean effective pressure or the like. In addition, when the ignition timing is retarded by the ignition timing retard amount in order to perform the AWS control as described above, the PCM 60 functions to correct the target charging efficiency so that the charging amount (intake air amount) can be increased by the amount corresponding to the ignition timing retard amount, to thereby cause the target torque determined in step S103 to be appropriately output from the engine 10.

Subsequently, in step S106, the PCM 60 functions to determine the position of the throttle valve 6 and the opening and closing timing of the air intake valve 12 via the variable air intake valve mechanism 18 taking into account the air amount detected by the air flow sensor 41 so that the air corresponding to the target charging efficiency set in step S105 can be introduced to the engine 10.

Subsequently, in step S107, the PCM 60 functions to control the throttle valve 6 and the variable air intake valve mechanism 18 based on the throttle position and the opening and closing timing of the air intake valve 12 determined in step S106, and also to control the fuel injector 13 based on target equivalent amount determined in accordance with the operating state of the engine 10 and the actual air amount estimated based on the air amount and so on detected by the air flow sensor 41.

Further, in parallel with the processes of steps S106 to S107, step S108 is executed and the PCM 60 functions to acquire a target supercharging pressure to be provided by the turbo-supercharger 4. For example, a map describing the target supercharging pressure to be assigned for respective ones of the engine speed and/or the engine load and/or the target torque is stored in the memory or the like in advance, and the PCM 60 functions to acquire the target supercharging pressure corresponding to the current engine speed and/or the engine load and/or the target torque with reference to the map. In such map of the target supercharging pressure, the target supercharging pressure is defined such that the supercharging by the turbo-supercharger 4 is implemented at least in a high load area of the engine 10.

Subsequently, in step S109, the PCM 60 functions to determine the position of the WG valve 31 for realizing the target supercharging pressure acquired in step S108.

Subsequently, in step S109, the PCM 60 functions to control the actuator of the WG valve 31 based on the position set in step S109. In this case, the PCM 60 functions to control the actuator of the WG valve 31 in accordance with the position determined in step S109, and also perform a feedback control of the actuator so that the supercharging pressure detected by the pressure sensor 43 can approach the target supercharging pressure acquired in step S108.

In addition, in parallel with the processes of steps S106 and S107, and those of steps S108 to S110, step S111 is executed, and the PCM 60 functions to control the ignition plug 14 so that the ignition is performed at the target ignition timing set in step S104.

<AWS Control Process>

Next, with reference to FIG. 4, description will be made on a basic process of an AWS control performed in the embodiments of the present invention. FIG. 4 is a flowchart depicting an AWS control process according to an embodiment of the present invention. The AWS control process is repeatedly executed with a given cycle period by the PCM 60, and in parallel with the engine control process depicted in FIG. 3.

First, in step S201, the PCM 60 functions to acquire various information signals of the vehicle. Specifically, the PCM 60 functions to acquire one or more of the accelerator position signal detected by the accelerator position sensor 40, the vehicle speed signal detected by the vehicle speed sensor 53, an engine speed signal corresponding to the crank angle signal detected by the crank angle sensor 46, the engine load signal corresponding to the intake air amount detected by the air flow sensor 41, and the water temperature signal detected by the temperature sensor 49. In addition, the PCM 60 functions to acquire a signal representing the temperature of the catalytic device 35 (catalyst temperature). Basically, the catalyst temperature is estimated based on the exhaust gas temperature when the vehicle is traveling, and immediately after the start-up of the vehicle, it is estimated based on the catalyst temperature estimated when the vehicle operation is terminated and a soaking time (time from shut-down to start-up of the engine).

Subsequently, in step S202, the PCM 60 functions to determine as to whether the engine is in a cold start state. Specifically, the PCM 60 functions to determine whether or not the water temperature acquired in step S201 is equal to or lower than the predetermined temperature (for example, 40 degrees Celsius) and the catalyst temperature acquired in step S201 is equal to or lower than the predetermined temperature (for example, 350 degrees Celsius). In this case, the PCM 60 functions to determine that the engine is in the cold start state when the water temperature is equal to or lower than the predetermined temperature and the catalyst temperature is equal to or lower than the predetermined value. By making such determination of step S202, the PCM 60 functions to determine as to whether the catalytic device 35 is in an activated state or not.

As a result of the determination in step S202, if it is determined that the engine is in the cold start state (step S202: Yes), the process proceeds to step S203. After step S203, since the catalytic device 35 is not in the activated state, the PCM 60 functions to execute the AWS control for accelerating the warm-up of the catalytic device 35. On the other hand, if it is not determined that the engine is in the cold start state (step S202: No), the process is terminated. In this case, since the catalytic device is in the activated state, the PCM 60 does not execute the AWS control.

In step S203, the PCM 60 functions to determine whether or not the engine is in an idle operation. In other words, the PCM 60 determines whether or not the vehicle is stopped. Specifically, the PCM 60 determines whether or not the accelerator position acquired in step S201 is 0 and the vehicle speed acquired in step S201 is 0. In this case, the PCM 60 functions to determine that the engine is in the idle operation when the accelerator position is 0 and the vehicle speed is 0.

As a result of the determination in step S203, when it is determined that the engine is in the idle operation (step S203: Yes), in other words, when the vehicle is stopped, the process proceeds to step S204. In step S204, the PCM 60 functions to perform, for executing the AWS control, an intake air amount control for increasing the intake air amount, and an ignition timing control for retarding ignition timing from the reference ignition timing, while performing a fuel injection control for injecting fuel such that a layer of concentrated or rich fuel-air mixture is formed in the vicinity of the ignition plug 14 as compared with an area around the ignition plug 14 in the combustion chamber 11 so as to produce a stratified charge combustion. In the followings, such AWS control performed when the vehicle is stopped is referred as a "weak stratified charge AWS control". Such weak stratified charge AWS control corresponds to a first warm-up control.

Specifically, when the weak stratified charge AWS control is performed, the PCM 60 functions to perform the ignition timing control for retarding the ignition timing from the reference ignition timing by the ignition timing retard amount in accordance with the operating state of the engine 10 (for example, driving levels of an air conditioner and/or alternator and/or oil pump, and/or external load of the engine 10 such as switching between ON/OFF), and also perform the intake air amount control for increasing the intake air amount based on the ignition timing retard amount, while performing the fuel injection control (more particularly, the control of fuel injection timing) for realizing the weak stratified charge combustion.

On the other hand, when it is not determined that the engine is in the idle operation (step S203: No), in other words when the vehicle is traveling, the process proceeds to step S205. In step S205, the PCM 60 functions to perform, for executing the AWS control, the intake air amount control for increasing the intake air amount and the ignition timing control for retarding the ignition timing from the reference ignition timing, while performing a fuel injection control for injecting fuel such that a homogeneous fuel-air mixture is formed in the combustion chamber 11 so as to produce a homogeneous combustion. In the followings, such AWS control performed when the vehicle is traveling is referred as a "homogeneous combustion AWS control". Such homogeneous combustion AWS control corresponds to a second warming-up control.

Specifically, when the homogeneous combustion AWS control is performed, the PCM 60 functions to perform the ignition timing control for retarding the ignition timing from the reference ignition timing by the ignition timing retard amount in accordance with the operating state of the engine 10 (engine speed and engine load) and the intake air amount control for increasing the intake air amount based on the ignition timing retard amount, while performing a fuel injection control (more particularly, the control of fuel injection timing) for realizing the homogeneous combustion. When such homogeneous combustion AWS control is performed, the PCM 60 functions to set the ignition timing retard amount based on an ignition timing retard map (refer to FIGS. 8 and 9) which will be described in the followings. Basically, the ignition timing retard amount applied in the homogeneous combustion AWS control is smaller than the ignition timing retard amount applied in the weak stratified charge AWS control, under the same operating state of the engine 10.

Subsequently, after performing the weak stratified charge AWS control in step S204 or the homogeneous combustion AWS control in step S205, the process proceeds to step S206. In step S206, the PCM 60 functions to determine whether or not the execution time of the weak stratified charge AWS control is equal to or more than a first predetermined time (for example, 30 seconds). The execution time of the weak stratified charge AWS control used herein is determined by an accumulation of the execution times wherein the weak stratified charge AWS control is applied. For example, when the homogeneous combustion AWS control is performed after the weak stratified charge AWS control, and then the weak stratified charge AWS control is performed again, the accumulation of the execution time of the first weak stratified charge AWS control and that of the second weak stratified charge AWS control is used as the executing time for making the determination in step S206. In addition, the first predetermined time used in step S206 is determined based on the execution time of the weak stratified charge AWS control necessary for warming up the catalytic device 35 sufficiently. In determining the first predetermined time, fuel consumption and/or degradation of drivability caused by the weak stratified charge AWS control execution may be taken into account.

As a result of the determination of step S206, when it is determined that the execution time of the weak stratified charge AWS control execution time is equal to or more than the first predetermined time (step S206: Yes), the process proceeds to step S208, and the PCM 60 functions to terminate the execution of the AWS control. Specifically, when the weak stratified charge AWS control has been executed by that time, the PCM 60 functions to terminate such weak stratified charge AWS control.

When the homogeneous combustion AWS control has been executed by that time, the PCM 60 functions to terminate such homogeneous combustion AWS control.

On the other hand, when it is not determined that the execution time of the weak stratified charge AWS control is equal to or more than the first predetermined time (step S206: No), in other words, when the execution time of the weak stratified charge AWS control is less than the first predetermined time, the process proceeds to step S207. In step S207, the PCM 60 functions to determine whether or not elapsed time after the engine start is equal to or more than the second predetermined time (for example, 80 seconds). The second predetermined time is determined as a time longer than the aforementioned first predetermined time, and is determined taking into account the degradation of the fuel consumption and/or the degradation of drivability caused by the long-time execution of the AWS control, in addition to the execution time of the AWS control necessary for warming up the catalytic device 35 sufficiently (for example, the time when only the homogeneous combustion AWS control is executed).

Further, under the cold start (when the catalytic device 35 is not in the activated state), because the operating state is changed between the situations where vehicle is stopped (idling operation) and where the vehicle is traveling, the weak stratified charge AWS control and the homogeneous AWS control are executed alternatively. Thus, the elapsed time after the engine start used in step S207 may basically correspond to the time obtained by summing the execution time of the weak stratified charge AWS control and the execution time of the homogeneous combustion AWS control.

As a result of the determination in step S207, when it is determined that the elapsed time after the engine start is equal to or more than the second predetermined time (step S207: Yes), the process proceeds to step S208, and then the PCM 60 functions to terminate the execution of both the weak stratified charge AWS control and the homogeneous combustion AWS control. On the other hand, when it is not determined that the elapsed time after the engine start is equal to or more than the second predetermined time (step S207: No), in other words, when the elapsed time after the engine start is less than the second predetermined value, the process returns to step S203. In this case, the PCM 60 functions to perform steps after the aforementioned step S203 again in order to continue the AWS control.

Further, in the aforementioned AWS control process, the AWS control is terminated based on time (specifically, the execution time of the stratified charge AWS control and/or the elapsed time after the engine start), but it may be possible to terminate the AWS control taking into account such time as well as total or accumulated fuel injection amount (corresponding to the heat quantity applied to the catalytic device 35) and/or catalyst temperature estimated as described above. Specifically, the AWS control may be terminated when any of the following conditions is satisfied: the execution time of the stratified charge AWS control is equal to or more than the first predetermined time; the elapsed time after the engine start is equal to or more than the second predetermined time; the total or accumulated fuel injection amount is equal to or more than a predetermined amount; and the estimated catalyst temperature is equal to or more than a predetermined temperature.

<Weak Stratified Charge Combustion and Homogeneous Combustion>

Next, with reference to FIGS. 5 to 7, the weak stratified charge combustion and the homogeneous combustion will be specifically described.

Figure 5A:
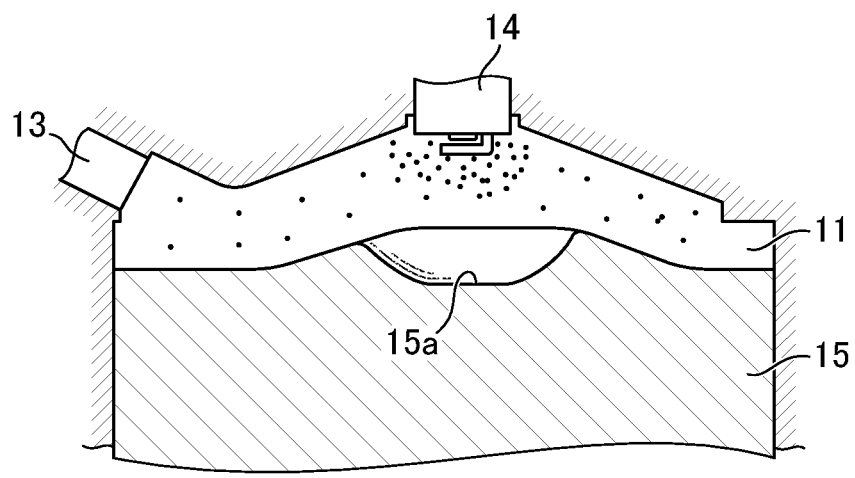
FIGS. 5A and 5B are illustrations which diagrammatically show a respective distribution states (concentration distribution) of fuel-air mixture formed in a combustion chamber before any one of weak stratified charge combustion and homogeneous combustion is produced.
Figure 5B:
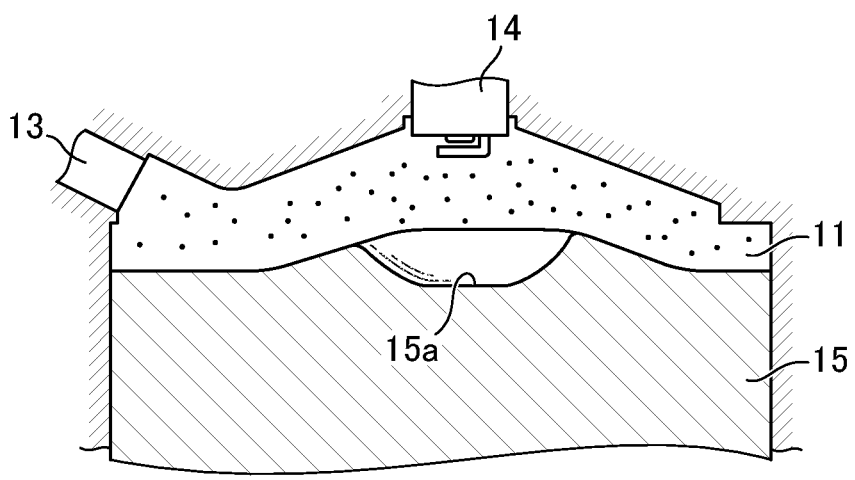

FIGS. 5A and 5B are illustrations which diagrammatically show a respective distribution state (concentration distribution) of fuel-air mixture formed in the combustion chamber 11 of the engine 10 before (immediately before) any one of the weak stratified charge combustion and the homogeneous combustion is produced. As shown in FIG. 5A, immediately before the weak stratified charge combustion is produced, the fuel-air mixture in the combustion chamber 11 becomes relatively rich in the vicinity of the ignition plug 14 (specifically, in the vicinity of an electrode of the ignition plug 14) and relatively lean around such rich region producing a weak stratified charge state. On the other hand, as shown in FIG. 5B, immediately before the homogeneous combustion is produced, a homogeneous furl-air mixture is formed in the combustion chamber 11, in other words, the state in which fuel is spread into the entire combustion chamber 11 is formed.

Since the weak stratified charge combustion produces a better combustion state than the homogeneous combustion, in the present embodiments, when the vehicle is stopped, the AWS control is executed with the weak stratified charge combustion is being produced (in other words, the weak stratified charge AWS control). On the other hand, if the weak stratified charge combustion is applied in a case where the AWS control is executed when the vehicle is traveling, there may be a case where a desired weak stratified charge combustion cannot be established due to a change in the operating state of the engine 10, and an misfire may occur. Therefore, in the present embodiments, when the vehicle is traveling, the AWS control (in other words, a homogeneous combustion AWS control) is executed while the homogeneous combustion is produced instead of the weak stratified charge combustion. However, since the homogeneous combustion produces a worse combustion state compared with the weak stratified charge combustion, as stated above, when the homogeneous combustion AWS control is executed, the ignition timing retard amount is made smaller than when the weak stratified charge AWS control is executed, under the same operating state of the engine 10.

Here, the degree of stratification of fuel-air mixture in the combustion chamber 11 of the engine 10 is referred as a "stratification level". For example, such stratification level corresponds to the concentration ratio of the fuel included in gas in the vicinity of the ignition plug 14 with respect to the concentration of the fuel included in gas inside the entire combustion chamber 11, and the stratification level shows a higher value as the ratio becomes larger (a difference between the concentration ratio of fuel included in gas in the vicinity of the ignition plug 14 and the concentration of fuel included in gas of the region around such region may be used). The state of the combustion chamber 11 when the aforementioned weak stratified charge combustion is produced (the weak stratified charge state) has a higher stratification level than the state of the combustion chamber 11 when the homogeneous combustion is produced. The PCM 60 functions to control the fuel injector 13, more specifically, functions to control the fuel injection timing of the fuel injector 13, in order to change the stratification level in the combustion chamber 11. More particularly, the PCM 60 functions to control the fuel injection timing of the fuel injector 13 to realize either of the weak stratified charge combustion or the homogeneous combustion at the time of the AWS control.

Next, with reference to FIGS. 6A and 6B, description will be made specifically on the fuel injection timing applied when respective ones of the weak stratified charge AWS control and the homogeneous combustion AW control is to be performed in the embodiments of the present invention. FIG. 6A depicts the fuel injection timing and the ignition timing applied when the weak stratified charge AWS control is performed, and FIG. 6B depicts the fuel injection timing and the ignition timing applied when the homogeneous combustion AW control is performed. FIGS. 6A and 6B respectively depict the crank angle in the horizontal axis.

As shown in FIG. 6A, when the weak stratified charge AWS control is performed, the PCM 60 functions to control the fuel injector 13 such that injection of the fuel is divided into two parts, specifically once in the air intake stroke and once in the compression stroke, that is, a total of two injections are performed per one cycle. More specifically, the PCM 60 functions to control the fuel injector 13 by starting the first fuel injection at a predetermined timing T11 in the late stage of the air intake stroke, and starting the second fuel injection at a predetermined timing T12 in the middle stage of the compression stroke. By dividing the injection of fuel into two parts at appropriately timings as described, a weak stratified charge state is formed in the combustion chamber 11. Specifically, with the first fuel injection in the air intake stroke, an expedited vaporization and atomization is produced in the combustion chamber 11, and then with the second fuel injection in the compression stroke, a rich fuel-air layer of high fuel concentration is formed in the vicinity of the ignition plug 14. In addition, as shown in FIG. 6A, when the weak stratified charge AWS control is to be performed, the PCM 60 functions to control the operation of the ignition plug 14 such that ignition occurs at an ignition timing T13 for which a relatively large retard amount is applied to the reference ignition timing. In the example shown in FIG. 6A, such ignition timing T13 is a timing substantially beyond the compression top dead center (TDC).

On the other hand, as shown in FIG. 6B, when the homogeneous AWS control is performed, the PCM 60 functions to control the fuel injector 13 such that fuel is injected only once in the air intake stroke. Specifically, the PCM 60 functions to control the fuel injector 13 such that the fuel injection is started at a predetermined timing T21 in the early stage of the air intake stroke. In addition, as shown in FIG. 6B, when the homogeneous AWS control is performed, the PCM 60 functions to control the operation of the ignition plug 14 such that ignition occurs at an ignition timing T22 for which a relatively small retard amount (specifically, said amount is smaller than the above ignition timing retard amount used in the weak stratified charge AWS control) is applied to the reference ignition timing. In the example shown in FIG. 6B, the ignition timing T22 does not exceed the compression top dead center (TDC). When the homogeneous AWS control is performed, it is not limited to perform the fuel injection once in a cycle. The fuel injection event may be divided into two or more injection parts.

Figure 7A:
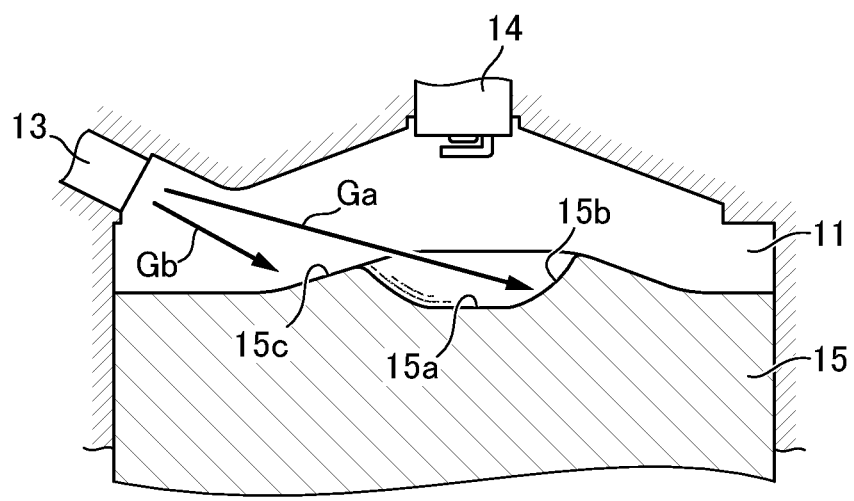
FIGS. 7A and 7B are illustrative diagrams with respect to an aspect where a weak stratified charge state is formed in a combustion chamber of an engine.
Figure 7B:
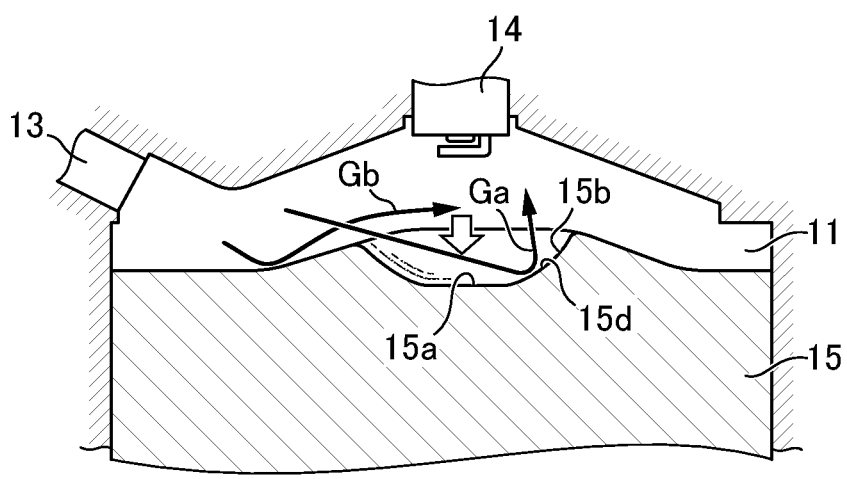

Next, with reference to FIGS. 7A and 7B, description will be made on an aspect where the weak stratified charge state is formed in the combustion chamber 11 of the engine 10. As shown in FIG. 7A, one fuel spray Ga from one injection hole of the multi-hole type fuel injector 13 is directed toward an inner periphery 15b having a substantially hemispherical shape of a concave cavity 15a formed on a crown surface of the piston 15. Thus, as shown in FIG. 7B, the fuel spray Ga is guided by an annular inclined surface 15d of the inner periphery 15b and smoothly and effectively diverted upward to be directed to the ignition plug 14.

On the other hand, as shown in FIG. 7A, a fuel spray Gb from another injection hole (the said injection hole which is different from the aforementioned one injection hole producing the fuel spray Ga) of the fuel injector 13 is directed toward a receiving surface 15c. Thus, the fuel spray Gb collides with the receiving surface 15c to have its momentum attenuated, and thus the fuel in the spray Gb drifts in the region above the receiving surface 15c. It should be noted herein that, after the fuel spray Ga has passed, there is produced a negative pressure which draws gas into the concave cavity 15a, so that the fuel spray Gb is drawn into the concave cavity 15a by the negative pressure as shown in FIG. 7B.

Thus, by the fuel spray Gb drawn into the concave cavity 15a in addition to the fuel spray Ga, an increased amount of fuel may present in the vicinity of the ignition plug 14, and as a result, a rich fuel-air mixture having a high fuel concentration may exist in the vicinity of the ignition plug 14. In other words, the weak stratified charge state can be formed in the combustion chamber 11.

<Ignition Timing Retard Map>

Next, description will be made on the ignition timing retard map according to an embodiment of the present invention. As described above, the ignition timing retard map is used for determining the ignition timing retard amount applied in the case when the homogeneous combustion AWS control is to be performed in step S203 of the AWS control process of FIG. 4. In the ignition timing retard map, the ignition timing retard amount which should be applied in the homogeneous combustion AWS control is preliminarily associated with each of the engine load and the engine speed. Specifically, the ignition timing retard amount in the ignition timing retard map includes such an amount that the drivability can be ensured and the catalytic device 35 can be early warmed up by the homogeneous combustion AWS without deteriorating the fuel consumption so much. In stating that the drivability is ensured it is intended herein to mean that the statement includes not only inhibition of the misfire but also suppression of combustion sound caused by the increase in the intake air amount due to the retarded ignition timing.

Figure 8:
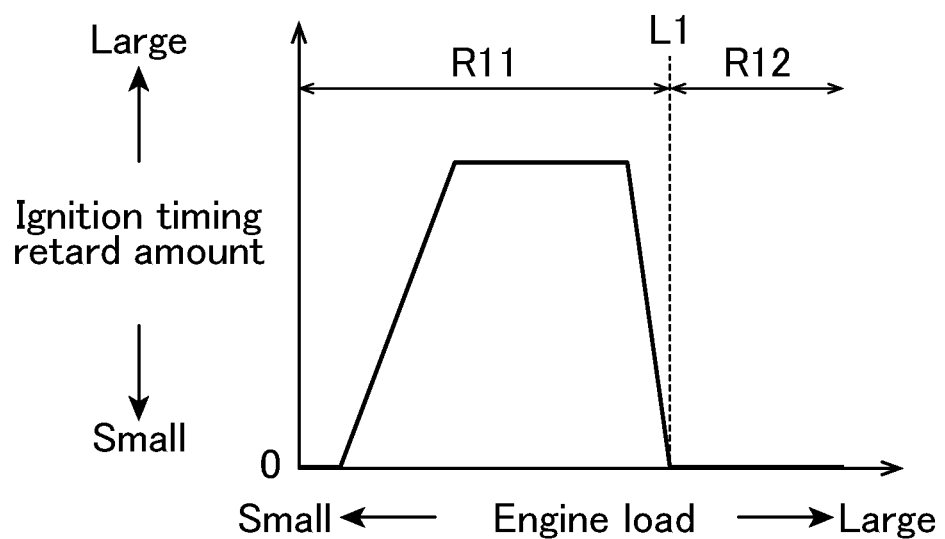
FIG. 8 is a graph of the ignition timing retard amount map specifically showing a relationship between the engine load (horizontal axis) and the ignition timing retard amount (vertical axis) under the same engine speed according to an embodiment of the present invention.

First, with reference to FIG. 8, description will be made on a relationship between the engine speed and the ignition timing retard amount defined in the ignition timing retard map according to an embodiment of the present invention. FIG. 8 is a graph of the ignition timing retard amount map specifically showing a relationship between the engine load (horizontal axis) and the ignition timing retard amount (vertical axis) under the same engine speed.

As shown in FIG. 8, in the present embodiment, under an engine load area shown by the reference character R11, the ignition timing retard map is defined such that a low load side of the engine load area has a smaller ignition timing retard amount than a high load side of the engine load area, under the same engine speed. Basically, in the engine load area R11, the ignition timing retard amount gradually becomes smaller as the engine load becomes lower. Since gas flow in the combustion chamber 11 is small in the low load area, flame propagation tends to become weak, and since combustion stability becomes lower than in the high load area, there is a tendency that the drivability is degraded if the ignition timing is largely retarded in the low load area. Therefore, in the present embodiment, the ignition timing retard amount is made smaller as the engine load becomes lower in order to suppress such degradation of drivability.

In addition, as shown in FIG. 8, in the present embodiment, under a high load side of the engine load area shown by a reference character R12, the ignition timing retard map is defined such that the ignition timing retard amount becomes smaller than the aforementioned engine load area R11. Specifically, the engine load area R12 corresponds to a supercharging area where supercharging by the turbo-supercharger 4 is effectively performed, and the engine load area R11 corresponds to a non-supercharging area where the supercharging by the turbo-supercharger 4 is not performed, and the timing retard amount is substantially 0 in the engine load area R12 which is in such supercharging area, in other words, retardation in the ignition timing from the reference ignition timing is inhibited. In the supercharging area, the amount of torque change with respect to the change of the ignition timing retard amount is larger than in the non-supercharging area, and in the supercharging area, torque adjustment is difficult at the time of the AWS control because of a poor capability of following the target supercharger pressure during the supercharging control based on a target supercharging pressure. On the other hand, since the injected heat quantity is large in the supercharging area, it is possible to increase temperature of the catalytic device 35 sufficiently even without retarding the ignition timing. Therefore, in the present embodiment, the retardation in the ignition timing from the reference ignition timing is inhibited in the supercharging area in order to suppress the torque variation caused by retarding the ignition timing in the supercharging area. In this case, the execution of the AWS control itself can be inhibited in the supercharging area.

Further, engine load L1 defining the border of the supercharging area and the non-supercharging area is the engine load with which the charge efficiency becomes substantially 1. In other words, supercharging by the turbo-supercharger 4 is implemented in the load area in which charging efficiency is 1 or higher.

Figure 9:
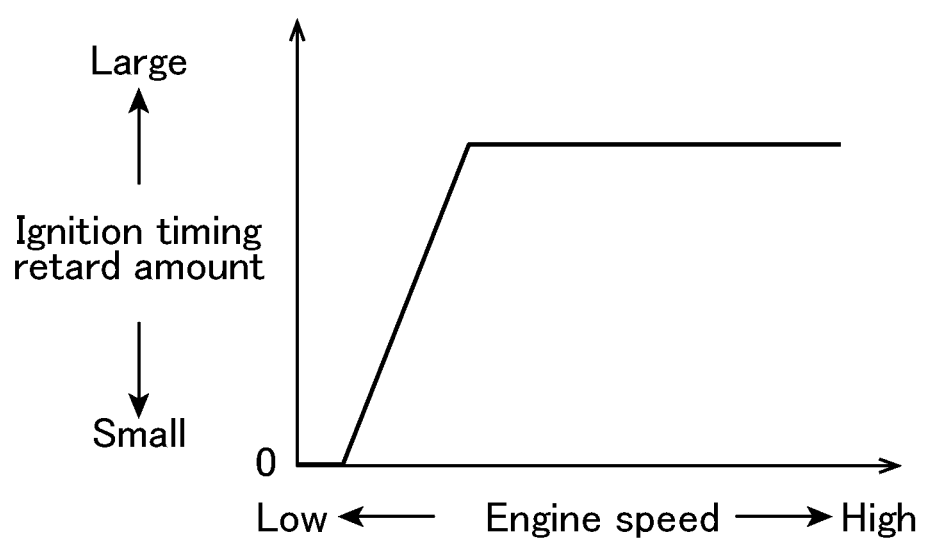
FIG. 9 is a graph of the ignition timing retard amount map specifically showing the relationship between the engine speed (horizontal axis) and the ignition timing retard amount (vertical axis) under the same engine load according to an embodiment of the present invention.

Next, with reference to FIG. 9, description will be made on a relationship between the engine speed and the ignition timing retard amount defined in the ignition timing retard map according to an embodiment of the present invention. FIG. 9 is a graph of the ignition timing retard amount map specifically showing the relationship between the engine speed (horizontal axis) and the ignition timing retard amount (vertical axis) under the same engine load.

As shown in FIG. 9, in the present embodiment, the ignition timing retard map is defined such that the ignition timing retard amount is larger in the high speed area than in the load speed area, under the same engine load. Basically, the ignition timing retard amount shows a larger value as the engine speed is increased. As the engine speed increases, the gas flow in the combustion chamber 11 becomes larger, and also the combustion stability gets higher, so that there will be less combustion instability even if the ignition timing is retarded by a relatively large amount. Thus, in the present embodiment, the ignition timing retard amount is made larger as the engine speed increases so that the temperature of the catalytic device 35 can be increased more promptly.

<Time Chart>

Next, with reference to FIG. 10, description will be made on a result of a case where the AWS control process (refer to FIG. 4) according to the aforementioned embodiments of the present invention is executed. FIG. 10 depicts an example of a time chart when the AWS control process according to embodiments of the present invention is executed. Specifically, FIG. 10 shows, starting from the top, the vehicle speed, the engine speed, the charging efficiency, the ignition timing, the ignition timing retard amount, the catalyst upstream side temperature (the temperature immediately upstream of the catalytic device 35), and the catalyst downstream side temperature (the temperature immediately downstream of the catalytic device 35). Further, in FIG. 10, the graph of solid line shows the result when the AWS control process according to the present embodiment is executed, and the graph of dashed line shows the result when the AWS control according to a comparative example is executed. In the comparative example, the AWS control (specifically, the weak stratified charge AWS control) is executed only when the vehicle is stopped, and the AWS control is not executed when the vehicle is traveling.

First, at time t11 which shows a timing immediately after the engine start, since the engine is under the cold start and in the idling operation, specifically, the water temperature is equal to or lower than the predetermined temperature, the catalyst temperature is equal to or lower than the predetermined temperature, the accelerator position is 0, and the vehicle speed is 0. Therefore, the weak stratified charge AWS control is executed in both of the present embodiment and the comparative example, so that the ignition timing is retarded under the weak stratified combustion. Then, at time t12, since the vehicle speed is increased beyond 0 and the vehicle goes into a traveling state, in the present embodiment, the weak stratified charge AWS control is terminated and the homogeneous combustion AWS control is started, so that the ignition timing is retarded under a homogeneous combustion. In other words, the weak stratified charge AWS control is switched to the homogeneous combustion AWS control. On the other hand, in the comparative example, the weak stratified charge AWS control is terminated at the time t12. In this case, the retardation of the ignition timing is terminated, and the ignition timing is set to the reference ignition timing.

Subsequently, at time t13, since the vehicle speed becomes 0 and the engine operation turns to the idling state (the state where the vehicle is stopped), in the present embodiment, the homogeneous combustion AWS control is terminated and the weak stratified charge AWS control is started. In other words, the AWS control is switched from the homogeneous combustion AWS control to the weak stratified charge AWD control. To the contrary, in the comparative example, the weak stratified charge AWS control is started again at the time t13. Then, at time t14, since the vehicle speed is increased beyond 0 and the vehicle goes into the traveling state, in the present embodiment, the weak stratified charge AWS control is terminated to start the homogeneous combustion AWS control. In the comparative example, the weak stratified charge AWS control is terminated. Then, at time t15, since the elapsed time after the engine start becomes the second predetermined time, in the present embodiment, both of the weak stratified charge AWS control and the homogeneous combustion AWS control are terminated.

Comparing the present embodiment with the comparative example as described above, it can be understood that the catalyst temperature is promptly increased in the present embodiment than in the comparative example, as shown in the catalyst upstream side temperature and the catalyst downstream side temperature in FIG. 10.

<Functional and Meritorious Effects>

Next, functional and meritorious effects of the engine control device according to embodiments of the present invention will be described.

According to the present embodiments, when the catalytic device 35 is not in the activated state, the AWS control is performed even when the vehicle is traveling, in other words, the AWS control is performed not only when the vehicle is in the stopped condition, but also when the vehicle is traveling, the temperature of the catalytic device 35 can be promptly increased to effectively accelerate warming-up of the catalytic device 35 compared with the case where the AWS control is performed only when the vehicle is stopped. In addition, according to the present embodiments, since the AWS control is performed under the homogeneous combustion when the vehicle is traveling, it is possible to appropriately suppress the misfire or the like phenomenon (the phenomenon that may be caused due to a failure of establishing the desired weak stratified charge state because of a change in the engine operating state) which may be caused in a case where the AWS control is performed when the weak stratified charge combustion is being executed and the vehicle is traveling.

In addition, according to the present embodiments, when the AWS control is to be performed under the homogeneous combustion and the vehicle is traveling, since the ignition timing retard amount for retarding the ignition timing from the reference ignition timing is varied taking into account the operating state of the engine 10, it is possible to appropriately warm up the catalyst device 35 by the AWS control while suppressing the degradation of drivability (for example, combustion sound and/or misfire) due to an excessive retardation in the ignition timing by the AWS control.

In addition, according to the present embodiments, since the ignition timing retard amount in the low load side of the engine load area is made smaller than that of the high load side of engine load area under the same engine speed, more particularly, since the ignition timing retard amount is made smaller as the engine load becomes lower, it is possible to appropriately suppress the degradation of drivability due to the large retardation in the ignition timing in the low load area.

In addition, according to the present embodiments, since the ignition timing retard amount of the high speed area is made larger than that of the low speed area under the same engine speed, in other words, since the ignition timing retard amount is made larger in the high speed area where the combustion stability becomes high, it is possible to increase the temperature of the catalytic device 35 promptly without degrading the combustion stability.

Further, according to the present embodiments, the AWS control is performed with the homogeneous combustion when the vehicle is traveling, and the AWS control is performed with the weak stratified charge combustion when the vehicle is stopped, in other words, the homogeneous combustion AWS control and the weak stratified charge AWS control are switched in accordance with the operating state of the vehicle Therefore, by executing the AWS control appropriate for the operating state, it is possible to promptly increase the temperature of the catalytic device 35 while appropriately suppressing the degradation of drivability such as the misfire or the like.

Still further, according to the present embodiments, since the intake air amount is increased in accordance with the ignition timing retard amount when the ignition timing is retarded by the AWS control, it is possible to appropriately realize the target toque even when the AWS control is being executed.

<Modifications>

In the above embodiment, the retardation in the ignition timing in the supercharging area is inhibited when the homogeneous combustion AWS control is being performed (FIG. 8), but the embodiments may not be limited to such inhibition of retardation in the ignition timing in the supercharging area, in other words, the ignition timing may be retarded even in the supercharging area. In such case, the ignition timing retard amount may be determined in accordance with the supercharging level provided by the turbo-supercharger 4. Specifically, when the supercharging level is large, the ignition timing retard amount may be made smaller than when the supercharging level is small. With this control, it may also be possible to appropriately carry out the warming-up of the catalyst device 35 while suppressing the torque variation which may be caused by retarding the ignition timing.

What is claimed is:

1. An engine control device, comprising
   a controller configured to perform a catalyst early warming control for accelerating a warm-up of a catalytic device provided on an exhaust gas passage,
   wherein, in order to accelerate the warm-up of the catalytic device when the catalytic device is not in an activated state and a vehicle is traveling, the controller is configured to perform:
   a fuel injection control to inject fuel such that a homogeneous fuel-air mixture can be formed in a combustion chamber of an engine so as to generate a homogeneous combustion;
   an intake air amount control to increase an intake air amount as compared with a situation when the catalyst early warming control is not performed; and
   an ignition control to retard an ignition timing from a reference ignition timing which is used in the situation when the catalyst early warming control is not performed,
   wherein the controller is further configured to vary an ignition timing retard amount corresponding to a difference between the ignition timing retarded by the ignition control and the reference ignition timing, in accordance with an engine speed and/or an engine load, and
   wherein, in a low load area where the engine load is lower than a predetermined value, the controller is configured to make the ignition timing retard amount smaller than in a high load area where the engine load is equal to or higher than the predetermined value, under the same engine speed.

2. The engine control device according to claim 1, wherein the controller is configured to make the ignition timing retard amount smaller as the engine load becomes lower.

3. The engine control device according to claim 1,
   wherein the reference ignition timing is set based on a target torque to be output from the engine, and
   wherein, when the ignition timing is retarded by the ignition timing retard amount from the reference ignition timing, the controller is configured to increase the intake air amount in accordance with the ignition timing retard amount so as to output the target torque from the engine.

4. The engine control device according to claim 1, wherein, when the catalytic device is not in the activated state and the vehicle is stopped, the controller is configured to perform the intake air amount control and the ignition control while performing the fuel injection control such that a layer of rich fuel-air mixture is formed in the vicinity of an ignition plug as compared with an area around the ignition plug in the combustion chamber of the engine so as to generate a stratified charge combustion, in order to accelerate the warm-up of the catalytic device.

5. The engine control device according to claim 1, wherein the controller is configured to:
   perform the fuel injection control of a fuel injector such that a first fuel injection is started in a late stage of an air intake stroke and a second fuel injection is started in a middle stage of a compression stroke; and
   perform the ignition control of an ignition plug such that an ignition occurs at a timing after a compression top dead center.

6. An engine control device, comprising
   a controller configured to perform a catalyst early warming control for accelerating a warm-up of a catalytic device provided on an exhaust gas passage,
   wherein, in order to accelerate the warm-up of the catalytic device when the catalytic device is not in an activated state and a vehicle is traveling, the controller is configured to perform:
   a fuel injection control to inject fuel such that a homogeneous fuel-air mixture can be formed in a combustion chamber of an engine so as to generate a homogeneous combustion;
   an intake air amount control to increase an intake air amount as compared with a situation when the catalyst early warming control is not performed; and
   an ignition control to retard an ignition timing from a reference ignition timing which is used in the situation when the catalyst early warming control is not performed,
   wherein the controller is further configured to vary an ignition timing retard amount corresponding to a difference between the ignition timing retarded by the ignition control and the reference ignition timing, in accordance with an engine speed and/or an engine load, and wherein, in a high speed area where the engine speed is equal to or higher than a predetermined value, the controller is configured to make the ignition timing retard amount larger than in a low speed area where the engine speed is lower than the predetermined value, under the same engine load.

* * * * *